United States Patent
Wu et al.

(10) Patent No.: US 12,348,093 B1
(45) Date of Patent: Jul. 1, 2025

(54) THREE-PHASE ASYNCHRONOUS MOTOR SQUIRREL-CAGE ROTOR STRUCTURE CAPABLE OF REDUCING STARTING CURRENT AND MOTOR

(71) Applicant: SHANXI ELECTRIC MOTOR MANUFACTURING CO., LTD., Taiyuan (CN)

(72) Inventors: Jiankang Wu, Taiyuan (CN); Zhifeng Zhang, Taiyuan (CN); Hongwei Deng, Taiyuan (CN); Zhen Wang, Taiyuan (CN); Lixia Yao, Taiyuan (CN); Heng Wang, Taiyuan (CN)

(73) Assignee: SHANXI ELECTRIC MOTOR MANUFACTURING CO., LTD., Taiyuan (CN)

( * ) Notice: Subject to any disclaimer, the term of this patent is extended or adjusted under 35 U.S.C. 154(b) by 0 days.

(21) Appl. No.: 18/873,162

(22) PCT Filed: May 13, 2024

(86) PCT No.: PCT/CN2024/092791
§ 371 (c)(1),
(2) Date: Dec. 9, 2024

(87) PCT Pub. No.: WO2024/199545
PCT Pub. Date: Oct. 3, 2024

(30) Foreign Application Priority Data

Nov. 29, 2023 (CN) .......................... 202311604643.2

(51) Int. Cl.
*H02K 17/16* (2006.01)
(52) U.S. Cl.
CPC ....... *H02K 17/168* (2023.05); *H02K 2213/03* (2013.01)

(58) Field of Classification Search
CPC .................. H02K 17/168; H02K 2213/03
See application file for complete search history.

(56) References Cited

U.S. PATENT DOCUMENTS

| 2015/0244234 | A1* | 8/2015 | Katsuki | .................... H02K 3/46 |
| | | | | 310/211 |
| 2018/0175680 | A1 | 6/2018 | Gieras | |
| 2018/0278106 | A1* | 9/2018 | Moriya | .................... H02K 1/30 |

FOREIGN PATENT DOCUMENTS

| CN | 1053974 A | 8/1991 |
| CN | 101552500 A | 10/2009 |

(Continued)

OTHER PUBLICATIONS

International Search Report dated Jul. 18, 2024 with Written Opinion for PCT/CN2024/092791 filed May 13, 2024.
(Continued)

*Primary Examiner* — Thomas Truong
(74) *Attorney, Agent, or Firm* — Paul D. Bianco; Fleit Intellectual Property Law

(57) ABSTRACT

A three-phase asynchronous motor squirrel-cage rotor structure capable of reducing starting current and a motor. The squirrel-cage rotor structure includes: a rotating shaft; a rotor core fixedly provided on the shaft; conducting bars provided in the rotor slots of the rotor core; two end rings fixedly provided at ends of the rotor core and integrally connecting the conducting bars to form a short circuit; and two starting rings provided at the outer ends of the end rings. The starting rings are fixedly connected with the end rings, with the gap therebetween being greater than 0 and less than 3 mm so that magnetic resistance between the end ring and the starting ring is reduced in the starting process of the motor, the eddy current effect of the starting ring is (Continued)

improved, the weakening effect on the starting current is improved, and the starting current is reduced.

8 Claims, 3 Drawing Sheets

(56) References Cited

FOREIGN PATENT DOCUMENTS

| | | |
|---|---|---|
| CN | 115118023 A | 9/2022 |
| CN | 117318341 A | 12/2023 |

OTHER PUBLICATIONS

Notification of Grant of Patent Right for Invention dated Feb. 5, 2024 of Chinese Priority Application No. 202311604643.2.
First Office Action dated Dec. 29, 2023 for Chinese Priority Application No. 202311604643.2.
Second Office Action dated Jan. 22, 2024 for Chinese Priority Application No. 202311604643.2.

\* cited by examiner

THREE-PHASE ASYNCHRONOUS MOTOR SQUIRREL-CAGE ROTOR STRUCTURE CAPABLE OF REDUCING STARTING CURRENT AND MOTOR

TECHNICAL FIELD

The present invention belongs to the technical field of motors, and particularly relates to a three-phase asynchronous motor squirrel-cage rotor structure capable of reducing starting current and a motor provided with the squirrel-cage rotor structure.

BACKGROUND

Three-phase asynchronous motor can be widely used in fans, water pumps, mining machinery and other occasions because of its simple structure, small size and high efficiency. However, during the starting process, the squirrel-cage induction motor will generate large current, which will impact the power grid and affect the normal operation of other electrical equipment.

In the development of three-phase asynchronous motor, various methods have been adopted to overcome the above problems.

Firstly, step-down starting, including star-delta starting, step-down starting, etc., can reduce the starting current of the motor, but the starting torque will be reduced a lot, which is only suitable for no-load or light-load starting. Secondly, the rotor of the wound rotor motor is externally connected with a starting rheostat to start. However, the wound rotor motor has a complex structure, a high failure rate and a high maintenance cost, which limits its application scope. At present, large equipment is mainly started by soft starter or frequency converter. By installing a soft starter or a frequency converter, the motor can start smoothly with little impact on the power grid. However, there are also problems of expensive equipment and high operation and maintenance costs in the later period.

In the above methods, the adjustments are all made on the electronic control side. On the motor side, the adjustments are nothing more than adjusting the number of turns of the coil, the slot type of the stator and the rotor, adjusting the core length, improving the material and resistivity of the conducting bar of the rotor, etc. Although these measures can reduce the starting current, the cost increases greatly and affects the stable operation of the motor.

At present, the requirements for energy saving and consumption reduction are getting higher and higher, and the application range of high power density and high efficiency three-phase asynchronous motors is also getting wider and wider. In order to meet the requirements of high power density and high energy efficiency of motors, many motor manufacturers reduce the number of coil turns and enlarge the slot shape to reduce motor loss and improve motor efficiency. But at the same time, the impedance is also reduced when the motor starts, which brings about an increase in the starting current of the motor. Moreover, for the energy-saving transformation site of client equipment, due to the small power grid capacity of the system, after the old motor is replaced with a high-efficiency motor, the phenomenon that the motor cannot be started frequently occurs, and the user experience is poor, which virtually creates technical problems for the energy-saving transformation of the customer's equipment.

SUMMARY

In order to solve some or all of the technical problems in the prior art, the present invention provides a three-phase asynchronous motor squirrel-cage rotor structure capable of reducing starting current and a motor provided with the squirrel-cage rotor structure, which can reduce the starting current in the starting process of the motor on the premise of ensuring that the performance of the motor is unchanged during continuous and stable operation.

The technical solution of the present invention is as follows:

In a first aspect, the present invention provides a three-phase asynchronous motor squirrel-cage rotor structure capable of reducing starting current, including:
  a rotating shaft;
  a rotor core fixedly provided on the rotating shaft;
  a plurality of conducting bars respectively provided in rotor slots of the rotor core;
  two end rings that are fixedly provided at two ends of the rotor core respectively and integrally connects the plurality of conducting bars on the rotor core to form a short circuit; and
  two starting rings that are respectively provided at outer ends of the two end rings, wherein the starting rings are fixedly connected with the end rings, and a gap between the starting rings and the end rings is controlled to be greater than 0 and less than 3 mm, wherein the starting rings are configured for reducing a magnetic resistance at the end rings, improving a magnetic circuit conduction efficiency, improving an eddy current effect of the starting rings and reducing a starting current of the motor;
  wherein cross section of the starting rings is any one of ⊢-shaped, L-shaped, ∪-shaped or rectangular;
  wherein an end face of an end of the starting ring far from the end ring is a plane, an inclined plane or a curved surface;
  wherein the end rings, the rotor core and the conducting bars are configured as an integral structure by casting, integral processing or machining;
  wherein the magnetic fields between the starting ring and the rotating shaft, the rotor core, the conducting bars, the end rings are mutually conducted, and the starting current satisfies the following equation:

$$1st = \frac{U_1}{X_m} \times \frac{1}{c + \frac{X_{1\sigma}}{X'_{2\sigma}}} + \frac{U_1}{\sqrt{(R_1 + cR'_2)^2 + (X_{1\sigma} + cX'_{2\sigma})^2}};$$

wherein, Ist represents a motor starting current, $U_1$ represents a motor rated voltage, $X_m$ represents a motor magnetizing reactance, $$c = 1 + \frac{X_{1\sigma}}{X_m}, X_{1\sigma}$$

represents a motor stator leakage reactance, $R_1$ represents a motor stator winding resistance, $R_2'$ represents motor rotor winding resistance, $X_{2\sigma}'$ represents a motor rotor leakage reactance; and, $$X'_{2\sigma} = 2\pi f \frac{w^2}{R_m}, \pi \approx 3.14,$$

w is the number of turns of rotor winding, $R_m$ is a reluctance at the end ring, and f is a current alternate frequency.

Further, the starting rings are made of a high magnetic permeability material.

Further, the starting rings are made of silicon steel sheet.

Further, the end rings, the rotor core and the conducting bars are fixedly connected by welding.

In a second aspect, the present invention provides a motor provided with the above three-phase asynchronous motor squirrel-cage rotor structure capable of reducing starting current.

The technical solutions of the invention have the follow advantages and beneficial effect:

According to the three-phase asynchronous motor squirrel-cage rotor structure capable of reducing starting current and the motor provided with the squirrel-cage rotor structure, by providing the starting rings and controlling the gap between the starting rings and the end rings to be greater than 0 and less than 3 mm, the magnetic resistance at the end ring of the motor during the starting process is reduced, and the eddy current effect of the starting ring is improved, so that the weakening effect on the starting current is improved. Therefore, the starting current in the starting process of the motor is reduced on the premise that the performance of the motor is not changed during stable operation. In addition, the structure is simple, the cost is low, and the application requirements of three-phase asynchronous motors with a high power density and high energy efficiency are satisfied.

BRIEF DESCRIPTION OF DRAWINGS

In order to more clearly explain the embodiments of the present invention or the technical solution in the prior art, the drawings needed to be used in the description of the embodiments or the prior art will be briefly introduced below. Obviously, the drawings in the following description are only some embodiments of the present invention, and other drawings can be obtained according to these drawings without creative labor for those skilled in the an. In the attached drawings.

DESCRIPTION OF REFERENCE SIGNS

Figure 1:
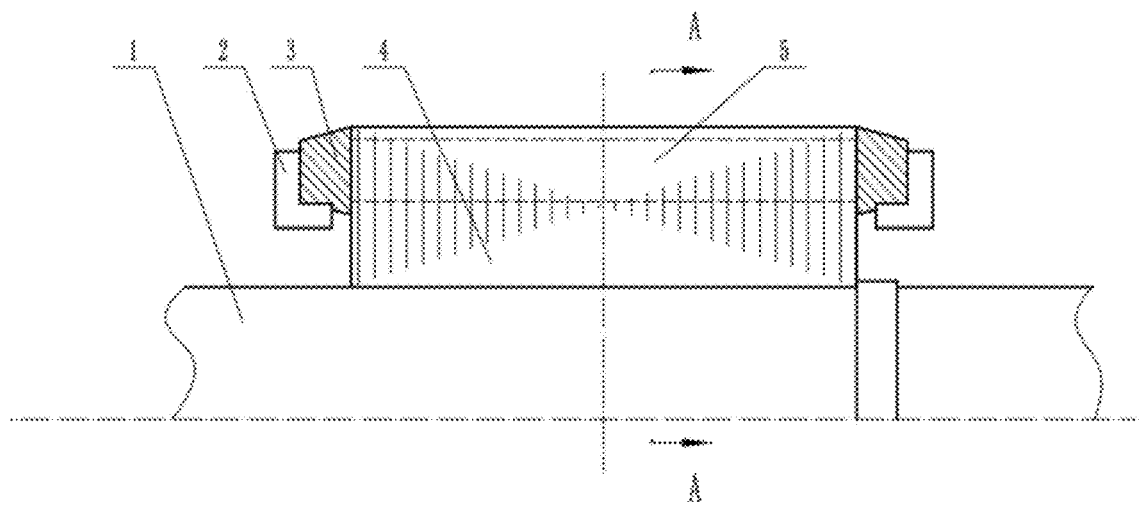
FIG. 1 is a schematic diagram of the overall structure of a three-phase asynchronous motor squirrel-cage rotor structure capable of reducing starting current according to the present invention.

1. Rotating shaft; 2. Stating ring; 21. ⌊-shaped starting ring; 22. ⊢-shaped staring ring; 23. Rectangular starting ring; 3. End ring; 4. Rotor core; 5. Conducting bar.

DESCRIPTION OF EMBODIMENTS

In order to make the object, technical solution and advantages of the present invention more clear, the technical solution of the present invention will be described clearly and completely with specific embodiments of the present invention and corresponding drawings. Obviously, the described embodiment is only part of, rather than all of the embodiments of the present invention. Based on die embodiment of the present invention, all other embodiments obtained by those skilled in the art without creative labor belong to the scope of protection of the present invention.

In the following, the technical solutions provided by the embodiments of the present invention will be described in detail with reference to the attached drawings.

As shown in FIG. 1, FIG. 2, and FIG. 4 to FIG. 7, the embodiments of the present invention provide a three-phase asynchronous motor squirrel-cage rotor structure capable of reducing starting current, which includes:

a rotating shaft 1;

a rotor core 4 fixedly provided on the rotating shaft 1;

a plurality of conducting bars 5, which are respectively provided in the rotor slots of the rotor core 4, and are the power source for the motor rotor to generate torque;

two end rings 3, which are fixedly provided at two ends of the rotor core 4 respectively, and integrally connect the plurality of conducting bars 5 on the rotor core 4 to form a short circuit;

two starting rings 2, which are respectively provided at the outer ends of two end rings 3 and are fixedly connected with the end rings 3, with a gap between the starting rings 2 and the end rings 3 being more than 0 and less than 3 mm, and are used to reduce the magnetic resistance at the end rings 3, improve the conduction efficiency of the magnetic circuit, and further reduce the starting current of the motor.

Therefore, in the three-phase asynchronous motor squirrel-cage rotor structure capable of reducing starting current in the embodiments of the present invention, the rotor core 4 provided with a plurality of conducting bars 5 is mounted on the rotating shat 1, and end rings 3 are fixedly provided at the two ends of the rotor core 4, the starting ring 2 is fixed at the outer end face of each end ring 3, and the gap between the starting ring 2 and the end face of the end ring 3 is controlled to be greater than 0 and less than 3 mm.

Specifically, the conducting bars 5 disposed in the rotor slots on the rotor core 4 are used to generate a rotor induced electromotive force and an induced current, and then transmit a electromagnetic torque.

Specifically, the starting ring 2 for reducing the magnetic resistance at the end ring 3 is made of a high magnetic permeability material. As an alternative implementation of the embodiment of the present invention, the starting ring 2 is made of a ferromagnetic material with a permeability of more than 100 or an alloy material formed by an iron product and rare earth elements, for example silicon steel sheets.

As an optional implementation of the embodiment of the present invention, the end rings 3, the rotor core 4 and the conducting bars 5 are an integrated structure, for example, they are fixedly connected by welding or configured as an integrated structure by casting, integral machining or machining, so that the overall strength of the end rings 3, the rotor core 4 and the conducting bars 5 is guaranteed, the problem that the end rings 3 are cracked or broken due to stress concentration and other problems in the long-term working process is avoided, and the stability of motor operation can be guaranteed.

As an alternative implementation of the embodiment of the present invention, the starting ring 2 is an integral annular structure to accurately ensure the relative position relationship between the starting ring 2 and the end ring 3.

Figure 4:
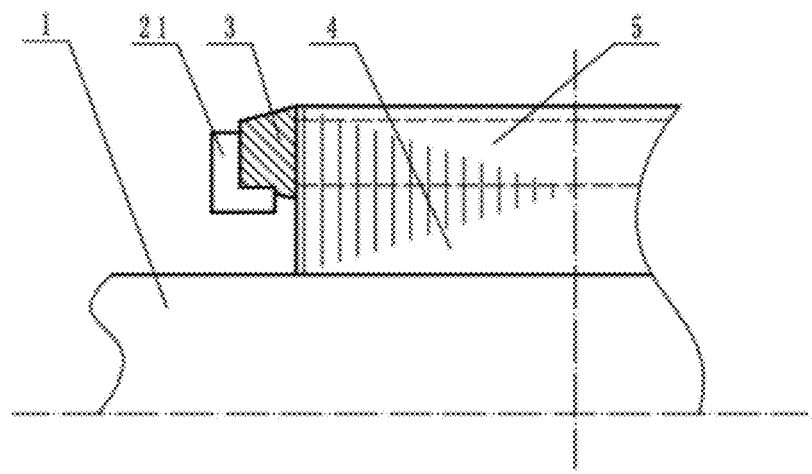
FIG. 4 is a schematic structural diagram of the three-phase asynchronous motor squirrel-cage rotor structure capable of reducing starting current provided with a ⌊-shaped starting ring according to an embodiment of the present invention.

As an alternative implementation of the embodiment of the present invention, the cross section of the starting ring 2 can be any one of ⊢-shaped, L-shaped, ∪-shaped or rectangular. FIG. 4 shows the structural schematic diagram of a squirrel-cage rotor structure with L-shaped starting rings 21, FIG. 5 shows the structural schematic diagram of a squirrel-cage rotor structure with ⊢-shaped starting rings 22, and FIG. 6 shows the structural schematic diagram of a squirrel-cage rotor structure with rectangular starting rings 23.

Figure 5:
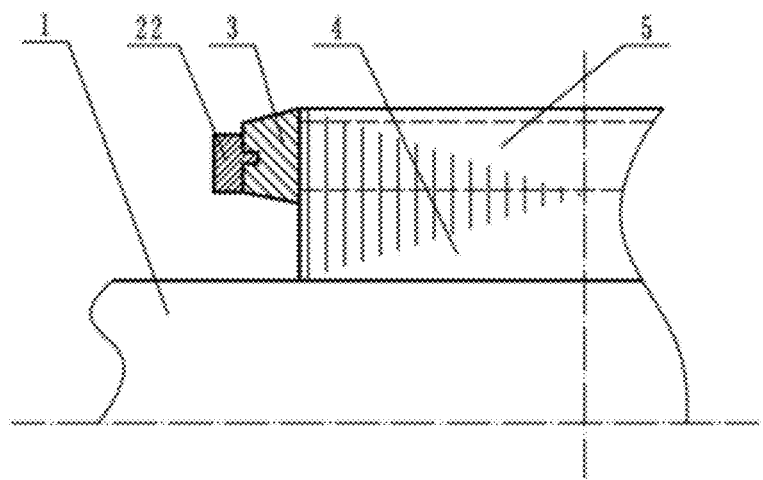
FIG. 5 is a schematic structural diagram of the three-phase asynchronous motor squirrel-cage rotor structure capable of reducing starting current provided with a ⊢-shaped starting ring according to an embodiment of the present invention.
Figure 6:
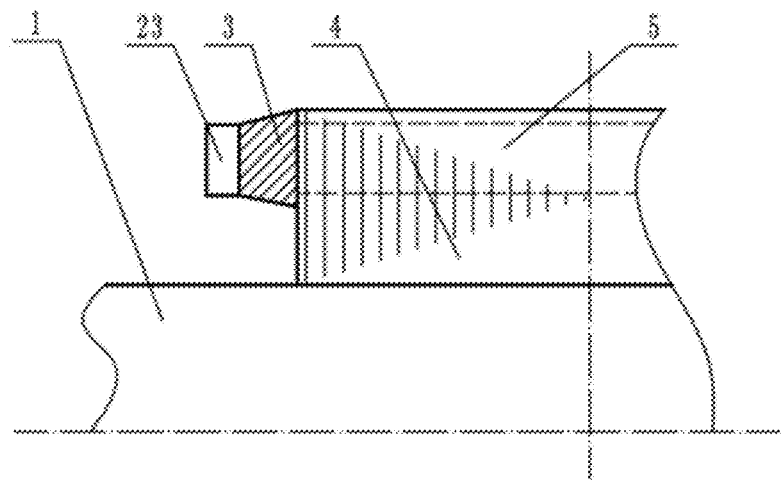
FIG. 6 is a schematic structural diagram of the three-phase asynchronous motor squirrel-cage rotor structure capable of reducing starting current provided with a rectangular starting ring according to an embodiment of the present invention.
Figure 7:
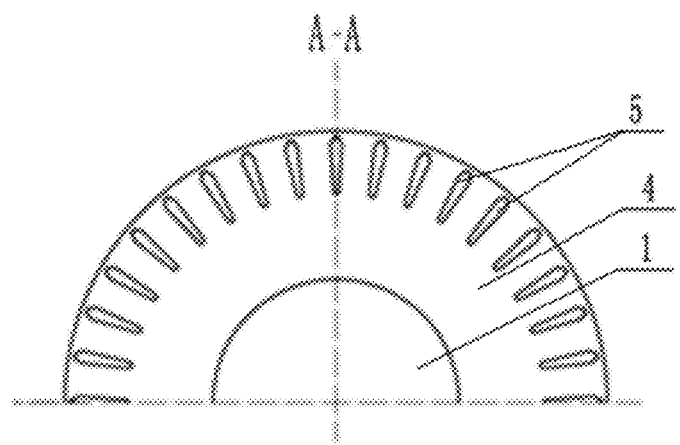
FIG. 7 is a schematic structural view taken along A-A in FIG. 1.

As an alternative implementation of the embodiment of the present invention, as shown in FIGS. 4 to 6, the gap between the starting ring 2 and the end ring 3 is 0.

It should be noted that although the end face of the starting ring 2 far away from the end ring 3 is shown in the drawings as a plane, in some alternative implementations of the embodiment of the present invention, the end face of the starting ring 2 far away from the end ring 3 may also be of an inclined plane or curved surface structure other than a plane.

The working principle of the three-phase asynchronous motor squirrel-cage rotor structure capable of reducing starting current of the present invention is as follows.

During the starting process of the motor, a power supply supplies power at a frequency of 50 Hz and the frequency of the motor stator current is also 50 Hz. Through the transition of the alternating magnetic field, an alternating current with the same frequency appears at the end ring 3 of the rotor, and the alternating current forms an alternating magnetic field around the end ring 3. The alternating magnetic field exists in the form of concentric circles concentric with the end ring 3, thereby generating an alternating leakage flux at the end ring 3, and the alternating leakage flux will form a leakage reactance. In the three-phase asynchronous motor squirrel-cage rotor structure capable of reducing starting current in the embodiment of the present invention, the starting ring 2 is fixed on the outer end face of each end ring 3, so that the magnetic fields between the starting ring 2 and the rotating shaft 1, the rotor core 4, the conducting bars and the end rings 3 are mutually conducted, and the following equation is satisfied:

$$\text{Ist} = \frac{U_1}{X_m} \times \frac{1}{c + \frac{X_{1\sigma}}{X'_{2\sigma}}} + \frac{U_1}{\sqrt{(R_1 + cR'_2)^2 + (X_{1\sigma} + cX'_{2\sigma})^2}}$$

where, Ist represents a motor starting current, $U_1$ represents a motor rated voltage, $X_m$ represents a motor magnetizing reactance, $$c = 1 + \frac{X_{1\sigma}}{X_m}, X_{1\sigma}$$

represents a motor stator leakage reactance, $X_{2\sigma}'$ represents a motor rotor leakage reactance, $R_1$ represents a motor stator winding resistance, $R_2'$ represents a motor rotor winding resistance. From the above equation, it can be seen that the starting current Ist of the motor is inversely related to the leakage reactance $X_{2\sigma}'$ of the motor rotor, that is, $X_{2\sigma}'$ increases while Ist decreases.

The motor rotor leakage reactance $X_{2\sigma}'$ includes rotor slot leakage reactance, rotor end leakage reactance and rotor harmonic leakage reactance. In view of the structure of the motor rotor and based on the operability of the structure, the present invention increases the rotor end leakage reactance by adding the starting ring 2 on the outer end face of each end ring 3, so as to reduce the starting current Ist of the motor by increasing the motor rotor leakage reactance $X_{2\sigma}'$. Specifically, the factor that affects the motor rotor leakage reactance $X_{2\sigma}'$ is:

$$X'_{2\sigma} = 2\pi f \frac{w^2}{R_m}$$

where $\pi \approx 3.14$, w is the number of turns of rotor winding, $R_m$ is a reluctance at the end ring 3, and f is a current alternate frequency. From the above formula, it can be seen that the motor rotor leakage reactance $X_{2\sigma}'$ is inversely related to the reluctance $R_m$ at the end ring 3, that is, the smaller the reluctance $R_m$ is, the greater the motor rotor leakage reactance is, and then the smaller the starting current Ist of the motor is.

Figure 2:
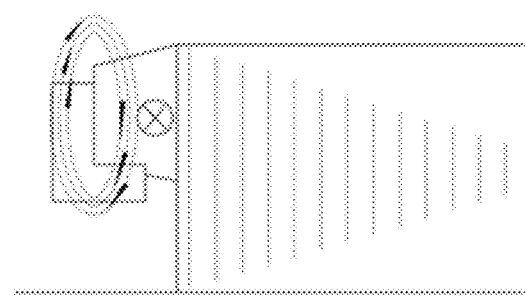
FIG. 2 is a schematic diagram of the leakage flux generated by the three-phase asynchronous motor squirrel-cage rotor structure capable of reducing starting current according to the present invention.
Figure 3:
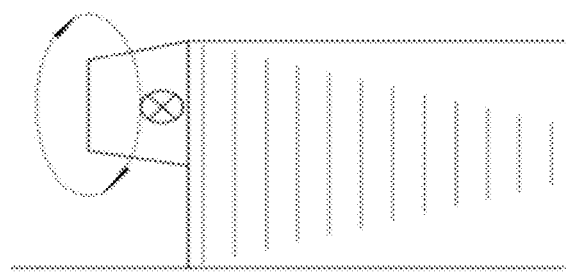
FIG. 3 is a comparative schematic diagram of magnetic leakage generated by the cage rotor structure of a three-phase asynchronous motor without starting rings in the prior art.

In order to make the structure and effect in the present invention more obvious, please refer to FIG. 2 and FIG. 3 for comparison, in which FIG. 2 shows the schematic diagram of the magnetic leakage generated by the three-phase asynchronous motor squirrel-cage rotor structure capable of reducing starting current provided with starting rings 2 according to of the present invention, and FIG. 3 shows the schematic diagram of the magnetic leakage generated by the squirrel-cage rotor structure of a three-phase asynchronous motor without starting ring in the prior art. As shown in FIG. 3, because the starting ring is not installed at the end ring, the air is around the end ring, and the air permeability is very low, that is, the magnetic resistance at the end ring is large, therefore the motor rotor leakage reactance is small during the motor starting process, and the motor starting current cannot be effectively reduced. As shown in FIG. 2, when the starting ring 2 is installed at the end ring 3, because the starting ring 2 is made of a high permeability material, the magnetic resistance at the end ring is much smaller than that of air, therefore a large leakage flux will be generated near the end ring 3, and an eddy current effect will be formed at the starting ring 2 (circular arc with arrow in the figure), thus forming a large motor rotor leakage reactance, which can reduce the starting current Ist of the motor when the motor is started; when the rotor is close to the rated speed, the motor is in a continuous running state, the rotor current frequency is low, and the eddy current effect of the starting ring 2 is reduced. Therefore, the performance (efficiency, power factor and maximum torque) of the motor in a continuous and stable running state is less affected.

Therefore, in the three-phase asynchronous motor squirrel-cage rotor structure capable of reducing starting current in the embodiment of the present invention, by providing the starting rings 2 and controlling the gap between the starting ring 2 and the end ring 3 to be greater that 0 and less than 3 mm, the magnetic resistance at the end ring 3 of the motor during the starting process can be reduced, and the eddy current effect of the starting ring 2 can be improved, thereby improving the weakening effect on the starting current, and reducing the starting current during the starting process of the motor on the premise of ensuring that the performance of the motor is unchanged during stable operation. It is verified by practice that when the distance between the starting ring 2 and the end ring 3 is greater than 3 mm, the reluctance between the end ring 3 and the starting ring 2 will increase, the leakage reactance of the motor rotor will be smaller, and the eddy current effect of the starting ring 2 will be reduced, thus reducing the weakening effect on the starting current. Therefore, in the three-phase asynchronous motor squirrel-cage rotor structure capable of reducing starting current in the embodiment of the present invention, in order to better reduce the starting current in the motor starting process, the distance between the starting ring 2 and the rotor end ring 3 is controlled within 3 mm, and the gap between the starting ring 2 and the end ring 3 is preferably set to 1 mm-2 mm according to the actual test and field installation requirements.

In addition, the present invention further provides a motor, which is provided with the three-phase asynchronous motor squirrel-cage rotor structure capable of reducing starting current in the above embodiment, so that the starting current in the starting process of the motor is reduced on the premise that the performance of the motor is not changed during the continuous and stable running process.

To sum up, according to the three-phase asynchronous motor squirrel-cage rotor structure capable of reducing starting current and the motor provided with the squirrel-cage rotor structure of the present invention, by providing the starting rings 2 and controlling the gap between the starting ring 2 and the end ring 3 to be greater than 0 and less than 3 mm, the magnetic resistance at the end ring 3 during the starting process of the motor is reduced, and the eddy current effect of the starting ring 2 is improved, thereby improving the weakening effect on the starting current. Therefore, on the premise of keeping the performance unchanged when the motor is running stably, the starting current in the starting process of the motor is reduced, and the structure is simple and the cost is low, which meets the application requirements of a three-phase asynchronous motor with a high power density and a high energy efficiency.

It should be noted that in this paper, relational terms such as "first" and "second" are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or equipment including a series of elements includes not only those elements, but also other elements not explicitly listed or elements inherent to such process, method, article or equipment. In addition, the words "front", "back", "left", "right", "upper" and "lower" in this paper are all to be construed based on the placement state shown in the drawings.

Finally, it should be explained that the above embodiments are only used to illustrate, rather than to limit the technical solution of the present invention. Although the present invention has been described in detail with reference to the foregoing embodiments, those skilled in the an should appreciate that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present invention.

What is claimed is:

1. A three-phase asynchronous motor squirrel-cage rotor structure capable of reducing starting current, comprising:
   a rotating shaft;
   a rotor core fixedly provided on the rotating shaft;
   a plurality of conducting bars respectively provided in rotor slots of the rotor core;
   two end rings that are fixedly provided at two ends of the rotor core respectively and integrally connects the plurality of conducting bars on the rotor core to form a short circuit; and
   two starting rings that are respectively provided at outer ends of the two end rings, wherein the starting rings are fixedly connected with the end rings, and a gap between the starting rings and the end rings is controlled to be greater than 0 and less than 3 mm, wherein the starting rings are configured for reducing a magnetic resistance at the end rings, improving a magnetic circuit conduction efficiency, improving an eddy current effect of the starting rings and reducing a starting current of the motor;
   wherein a cross section of the starting rings is any one of ⊢-shaped, ∟-shaped, ∪-shaped or rectangular;
   wherein an end face of an end of the starting ring far from the end ring is a plane, an inclined plane or a curved surface;
   wherein the end rings, the rotor core and the conducting bars are configured as an integral structure by casting, integral processing or machining;
   wherein the magnetic fields between the starting ring and the rotating shaft, the rotor core, the conducting bars, the end rings are mutually conducted, and the starting current satisfies the following equation:

$$1st = \frac{U_1}{X_m} \times \frac{1}{c + \frac{X_{1\sigma}}{X'_{2\sigma}}} + \frac{U_1}{\sqrt{(R_1 + cR'_2)^2 + (X_{1\sigma} + cX'_{2\sigma})^2}}$$

wherein, Ist represents a motor starting current, $U_1$ represents a motor rated voltage, $X_m$ represents a motor magnetizing reactance, $$c = 1 + \frac{X_{1\sigma}}{X_m}, X_{1\sigma}$$

represents a motor stator leakage reactance, $R_1$ represents a motor stator winding resistance, $R_2'$ represents motor rotor winding resistance, $X_{2\sigma}'$ represents a motor rotor leakage reactance; and, $$X'_{2\sigma} = 2\pi f \frac{w^2}{R_m}, \pi \approx 3.14,$$

w is the number of turns of rotor winding, $R_m$ is a reluctance at the end ring, and f is a current alternate frequency.

2. The three-phase asynchronous motor squirrel-cage rotor structure capable of reducing starting current according to claim 1, wherein the starting rings are made of a high magnetic permeability material.

3. The three-phase asynchronous motor squirrel-cage rotor structure capable of reducing starting current according to claim 2, wherein the starting rings are made of silicon steel sheet.

4. A motor provided with the three-phase asynchronous motor squirrel-cage rotor structure capable of reducing starting current according to claim 3.

5. A motor provided with the three-phase asynchronous motor squirrel-cage rotor structure capable of reducing starting current according to claim 2.

6. The three-phase asynchronous motor squirrel-cage rotor structure capable of reducing starting current according to claim 1, wherein the end rings, the rotor core and the conducting bars are fixedly connected by welding.

7. A motor provided with the three-phase asynchronous motor squirrel-cage rotor structure capable of reducing starting current according to claim 6.

8. A motor provided with the three-phase asynchronous motor squirrel-cage rotor structure capable of reducing starting current according to claim 1.

* * * * *